United States Patent
Yen (10) Patent No.: US 8,005,302 B2
(45) Date of Patent: Aug. 23, 2011

(54) DATA MODULATION/ENCRYPTION METHOD USED IN HOLOGRAPHIC STORAGE SYSTEM

(75) Inventor: Chia-Han Yen, Hsinchu (TW)

(73) Assignee: Lite-On It Corp., Taipei (TW)

( * ) Notice: Subject to any disclaimer, the term of this patent is extended or adjusted under 35 U.S.C. 154(b) by 800 days.

(21) Appl. No.: 12/036,972

(22) Filed: Feb. 25, 2008

(65) Prior Publication Data

US 2008/0212424 A1   Sep. 4, 2008

(30) Foreign Application Priority Data

Mar. 1, 2007   (TW) ............................... 96107045 A (51) Int. Cl.
*G06K 9/36* (2006.01)
*G11B 20/08* (2006.01)
*G06K 9/46* (2006.01)

(52) U.S. Cl. ..................................... 382/232; 369/47.19

(58) Field of Classification Search .................. 382/173, 382/210, 232, 233, 237, 305; 359/1, 3, 15, 359/21, 22, 30; 714/758, 781, 799, 801; 358/1.9, 3.03, 3.04; 375/216, 259–261; 341/50, 341/51, 58, 87; 369/47.19, 103, 109.1, 110.03
See application file for complete search history.

(56) References Cited

U.S. PATENT DOCUMENTS

| | | | |
|---|---|---|---|
| 6,549,664 B1 | 4/2003 | Daiber et al. | |
| 6,697,169 B1* | 2/2004 | Feng et al. | 358/3.04 |
| 6,895,547 B2* | 5/2005 | Eleftheriou et al. | 714/801 |
| 6,985,536 B2* | 1/2006 | Oelcer et al. | 375/261 |
| 7,365,656 B2* | 4/2008 | Hara et al. | 341/50 |
| 7,414,549 B1* | 8/2008 | Yang et al. | 341/50 |
| 7,755,820 B2* | 7/2010 | Tateishi et al. | 359/21 |
| 2006/0239336 A1* | 10/2006 | Baraniuk et al. | 375/216 |
| 2007/0206697 A1* | 9/2007 | Qiu et al. | 375/267 |
| 2008/0082895 A1* | 4/2008 | Eroz et al. | 714/758 |
| 2008/0212424 A1* | 9/2008 | Yen | 369/47.19 |

* cited by examiner

*Primary Examiner* — Amir Alavi (74) *Attorney, Agent, or Firm* — WPAT, PC; Justin King (57) ABSTRACT

The disclosure is a data modulation/encryption method used in a holographic storage system. The data modulation method includes steps of: receiving an original data sequence; arraying the original data sequence to a first matrix with n×n dimensions; multiplying the first matrix by a sparse matrix to generate a second matrix with n×n dimensions; executing a modulating and mapping procedure for generating a third matrix with (n+1)×n or n×(n+1) dimensions, wherein the third matrix is composed of a modulation part and an extra part; and, storing the third matrix; wherein the sparse matrix is a binary matrix, a total number of elements in each row of the sparse matrix is odd, all rows of the sparse matrix have a same even number of bit 1, all columns of the sparse matrix have a same even number of bit 1, and the sparse matrix has an inverse matrix.

14 Claims, 7 Drawing Sheets

| original data sequence | new data sequence |
|---|---|
| 0 0 0 0 | 0 0 0 0 0 |
| 0 0 0 1 | 0 0 0 0 1 |
| 0 0 1 0 | 1 1 0 1 1 |
| 0 0 1 1 | 0 0 1 1 1 |
| 0 1 0 0 | 0 1 0 1 1 |
| 0 1 0 1 | 0 0 1 0 1 |
| 0 1 1 0 | 1 1 1 1 0 |
| 0 1 1 1 | 0 1 1 1 1 |
| 1 0 0 0 | 1 1 0 0 0 |
| 1 0 0 1 | 1 0 1 0 0 |
| 1 0 1 0 | 1 0 1 0 1 |
| 1 0 1 1 | 1 0 1 1 1 |
| 1 1 0 0 | 1 1 1 0 0 |
| 1 1 0 1 | 1 1 0 1 0 |
| 1 1 1 0 | 1 1 1 0 1 |
| 1 1 1 1 | 1 1 1 1 1 |

DATA MODULATION/ENCRYPTION METHOD USED IN HOLOGRAPHIC STORAGE SYSTEM

FIELD OF THE INVENTION

The present invention relates to a data modulation/encryption method used in a holographic storage system, and more particularly to a data modulation/encryption method used in a holographic storage system by employing a sparse matrix.

BACKGROUND OF THE INVENTION

Figure 1:
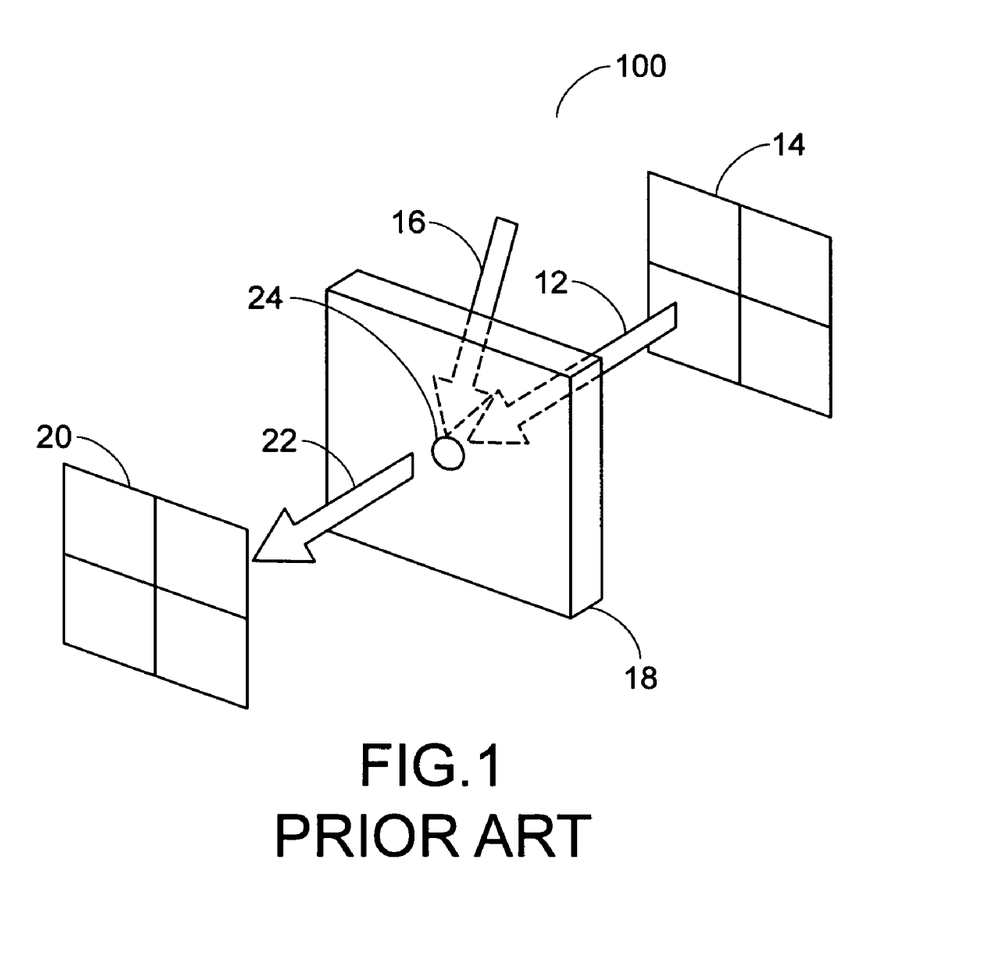
FIG. 1 is a diagram illustrating a holographic storage system.

FIG. 1 is a diagram showing a holographic storage system. The holographic storage system 100 comprises: a signal beam 12, a data plane 14, a reference beam 16, a storage medium 18, a data beam 22, and a detecting apparatus 20.

A light source (e.g. a laser light source) is split into two light beams by a beam splitter (not shown), wherein one of these two light beams is converted to the signal beam 12 after the light beam is passed through the data plane 14, in another word, an image frame presented on the data plane 14 is contained in the signal beam 12; and another light beam is the reference beam 16. When the signal beam 12 and the reference beam 16 are together focused on the storage medium 18, an interference strip, generated by the signal beam 12 and the reference beam 16, is formed on the focal point 24, wherein the interference strip can be regarded as a grating. When the focal point 24 in the storage medium 18 is only focused by the reference beam 16, the data beam 22 is then generated and outputted from the extended direction of the signal beam 12, and the image frame originally presented on the data plane 14 can be read out if the detecting apparatus 20 is placed on the path of the data beam 22.

A data-recording process in the holographic storage system 100 comprises steps of: converting the original data to an image frame and presenting the image frame on the data plane 14; converting a light beam to the signal beam 12 by using the data plane 14; and recording the focal point 24 with an interference strip in the storage medium 18 through focusing the signal beam 12 and the reference beam 16 on the focal point 24. A data-reading process in the holographic storage system 100 comprises steps of: focusing the reference beam 16 on the focal point 24 in the storage medium 18 to generate the data beam 22 which is outputted from the extended direction of the signal beam 12; placing the detecting apparatus 20 on the path of the data beam 22 for presenting the image frame contained in the data beam 22 on the detecting apparatus 20; and converting the image frame presented on the detecting apparatus 20 to the original data.

Generally, the data plane 14 is a SLM (spatial light modulator), and the SLM can be a DMD (digital micro-mirror device) or a LCD (liquid crystal display). Both the DMD and the LCD are composed by a plurality of presenting units arranged as an array, and these presenting units with different intensities serve to present an image frame. In addition, the storage medium 18 is a Photopolymer. The detecting apparatus 20 can be a CCD (charge-coupled device) or a CMOS (complementary metal oxide semiconductor). Both the CCD and the CMOS are also composed by a plurality of sensing units arranged as an array, and these sensing units serve for receiving the image frame presented on the presenting units of the data plane 14.

Because the data plane 14 is a matrix with 2 dimensions, and each presenting unit in the matrix is capable of presenting a dark state and a bright state, the image frame is a set by all the presenting units with dark states or bright states on the data plane 14. Generally, the bright state represents a binary bit 1, and the dark state represents a binary bit 0.

It is understood that the bright state may interfere with the dark state. In another word, the SNR (signal to noise ratio) may be relatively high if the number of the bright states is greater than the number of the dark states, and the relatively high SNR may accordingly result in the data read error when the detecting apparatus detects the image frame.

Therefore, providing a data modulation/encryption method for reducing the number of the bright states less than the number of the dark states, so as to reducing the SNR, is the main purpose of the present invention.

SUMMARY OF THE INVENTION

There, the present invention discloses a data modulation method, comprising steps of: receiving a first data sequence; arraying the first data sequence to a first matrix with n×n dimensions; providing a sparse matrix with n×n dimensions; multiplying the first matrix by the sparse matrix to generate a second matrix with n×n dimensions; executing a modulating and mapping procedure for generating a third matrix with (n+1)×n or n×(n+1) dimensions, wherein the third matrix is composed of a modulation part and an extra part; and storing the third matrix; wherein the sparse matrix is a binary matrix, each row in the sparse matrix has an odd number of elements, all rows in the sparse matrix have a same even number of bit 1, all columns in the sparse matrix have a same even number of bit 1, and the sparse matrix has an inverse matrix.

Moreover, the present invention discloses a encoding/decoding method, comprising steps of: arraying a data to a first matrix with n×n dimensions; providing a sparse matrix with n×n dimensions; multiplying the first matrix by the sparse matrix to generate a second matrix with n×n dimensions; executing a modulating and mapping procedure to the second matrix to generate a third matrix with (n+1)×n or n×(n+1) dimensions, wherein the third matrix is composed of a modulation part and an extra part; transmitting the modulation part and the sparse matrix to a receiving end via a public channel; transmitting the extra part to the receiving end via a private channel; and restoring the data by using the modulation part, the sparse matrix, and the extra part; wherein the sparse matrix is a binary matrix, each row in the sparse matrix has an odd number of elements, all rows in the sparse matrix have a same even number of bit 1, all columns in the sparse matrix have a same even number of bit 1, and the sparse matrix has an inverse matrix.

BRIEF DESCRIPTION OF THE DRAWINGS

The present invention can be fully understood from the following detailed description and preferred embodiment with reference to the accompanying drawings in which.

DETAILED DESCRIPTION OF THE PREFERRED EMBODIMENTS

To make an image frame on a data plane have less bright states than dark states, the present invention discloses a data modulation/encryption method used in a holographic storage system, wherein the original data sequence is modulated through employing a sparse matrix, and the modulated data is then restored back to the original data sequence through employing an inverse matrix of the sparse matrix.

Figure 2:
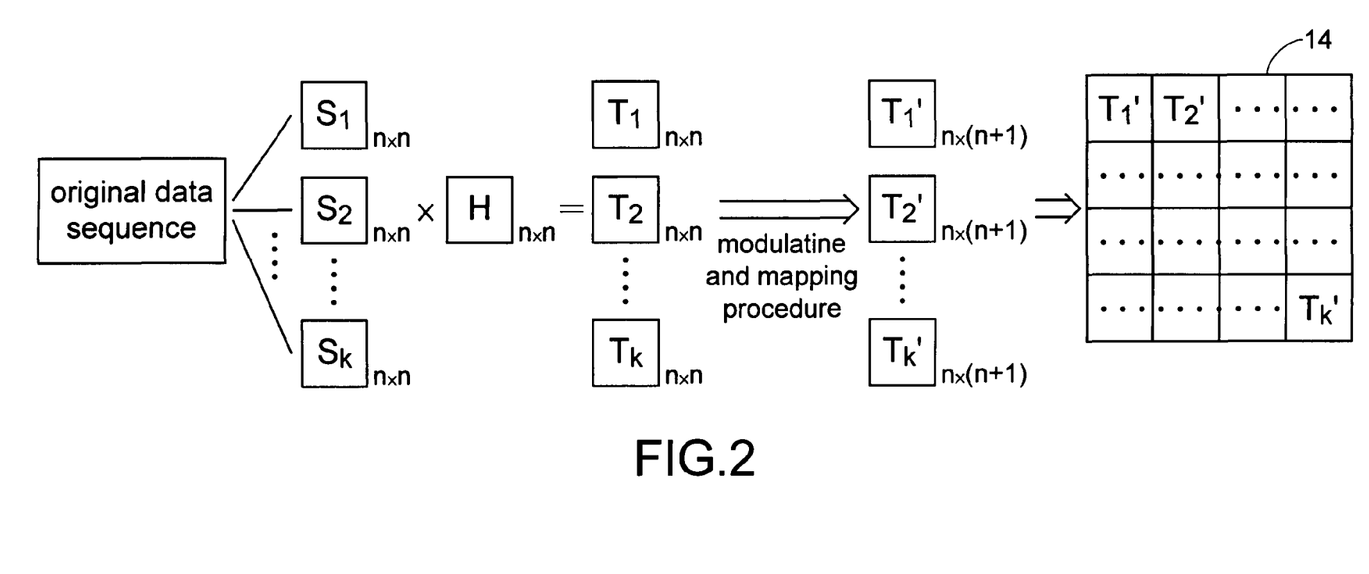
FIG. 2 is a flow chart showing a process of modulating an original data sequence to an image frame of the present invention in a holographic storage system.

FIG. 2 is a flow chart showing a process of modulating an original data sequence to an image frame of the present invention in a holographic storage system. When the holographic storage system receives the original data sequence, which is transmitted from a Host, a control circuit (not shown) in the holographic storage system then sequentially arrays the original data sequence to k numbers of matrices ($S_1 \sim S_k$) with n×n dimensions. Another k numbers of matrices ($T_1 \sim T_k$) with n×n dimensions are then generated through respectively multiplying the k numbers of matrices ($S_1 \sim S_k$) by a sparse matrix ($H_{n \times n}$) with n×n dimensions. The k numbers of matrices ($T_1 \sim T_k$) are converted to k numbers of matrices ($T_1' \sim T_k'$) with n×(n+1) dimensions through executing a modulating and mapping procedure. Finally, the image frame is then generated after the k numbers of matrices ($T_1' \sim T_k'$) with n×(n+1) dimensions sequentially presented on the data plane 14.

In the embodiment of the present, the definition of the sparse matrix ($H_{n \times n}$) follows the rules of: (I) The sparse matrix ($H_{n \times n}$) is a binary matrix, in another word, each element in the sparse matrix ($H_{n \times n}$) is "0" or "1"; (II) The sparse matrix ($H_{n \times n}$) is a square matrix; (III) Each row/column in the sparse matrix ($H_{n \times n}$) has an odd number of elements; (IV) Each row in the sparse matrix ($H_{n \times n}$) has a same even number R of "1"; (V) Each column in the sparse matrix ($H_{n \times n}$) has a same even number C of "1"; and (VI) The sparse matrix ($H_{n \times n}$) has an inverse matrix.

As depicted in FIG. 2, the modulating and mapping procedure functions for converting the k numbers of matrices ($T_1 \sim T_k$) with n×n dimensions to the k numbers of matrices ($T_1' \sim T_k'$) with n×(n+1) dimensions, wherein the k numbers of modulated matrices ($T_1' \sim T_k'$) with n×n dimensions are defined as a modulation part, the new generated k numbers of matrices with n×1 dimensions are defined as an extra part, and the k numbers of matrices ($T_1' \sim T_k'$) with n×(n+1) dimensions are composed by the modulation part and the extra part.

The modulating and mapping procedure, applied to a matrix $T_1$, follows the rules of: (I) Setting an element in the extra part to "0" if a corresponding row in the matrix $T_1$ has an even number of elements having an even value; alternatively, setting an element in the extra part to "1" if a corresponding row in the matrix $T_1$ has an odd number of elements having an even value; and (II) Completing the modulation part through setting all elements having an even value in the matrix $T_1$ to "0" and setting all elements having an odd value in the matrix $T_1$ to "1".

Following is an example of modulating an original data sequence to an image frame of the present invention. In the example, the sparse matrix is a matrix with 5×5 dimensions ($H_{5 \times 5}$); each row in the sparse matrix ($H_{5 \times 5}$) has two "1"s; each column in the sparse matrix ($H_{5 \times 5}$) has two "1"s, that is R=C=2. In the example, the sparse matrix ($H_{5 \times 5}$) and the its inverse matrix are:

$$H_{5 \times 5} = \begin{bmatrix} 1 & 0 & 0 & 1 & 0 \\ 1 & 0 & 0 & 0 & 1 \\ 0 & 1 & 0 & 1 & 0 \\ 0 & 0 & 1 & 0 & 1 \\ 0 & 1 & 1 & 0 & 0 \end{bmatrix}, H_{5 \times 5}^{-1} = \frac{1}{2} \begin{bmatrix} 1 & 1 & -1 & -1 & 1 \\ -1 & 1 & 1 & -1 & 1 \\ 1 & -1 & -1 & 1 & 1 \\ 1 & -1 & 1 & 1 & -1 \\ -1 & 1 & 1 & 1 & -1 \end{bmatrix}$$

Assuming the matrix $S_1$, arrayed from the original data sequence, is:

$$S_1 = \begin{bmatrix} 1 & 1 & 1 & 1 & 1 \\ 1 & 1 & 1 & 0 & 0 \\ 0 & 0 & 1 & 1 & 1 \\ 0 & 1 & 1 & 1 & 0 \\ 1 & 1 & 0 & 0 & 1 \end{bmatrix}$$

The matrix $T_1$ is given by the equation:

$$T_1 = S_1 \times H_{5 \times 5} = \begin{bmatrix} 1 & 1 & 1 & 1 & 1 \\ 1 & 1 & 1 & 0 & 0 \\ 0 & 0 & 1 & 1 & 1 \\ 0 & 1 & 1 & 1 & 0 \\ 1 & 1 & 0 & 0 & 1 \end{bmatrix} \times \begin{bmatrix} 1 & 0 & 0 & 1 & 0 \\ 1 & 0 & 0 & 0 & 1 \\ 0 & 1 & 0 & 1 & 0 \\ 0 & 0 & 1 & 0 & 1 \\ 0 & 1 & 1 & 0 & 0 \end{bmatrix} = \begin{bmatrix} 2 & 2 & 2 & 2 & 2 \\ 2 & 1 & 0 & 2 & 1 \\ 0 & 2 & 2 & 1 & 1 \\ 1 & 1 & 1 & 1 & 2 \\ 2 & 1 & 1 & 1 & 1 \end{bmatrix}$$

The matrix $$T_1' = \begin{bmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \\ a_{41} & a_{42} & a_{43} & a_{44} & a_{45} & a_{46} \\ a_{51} & a_{52} & a_{53} & a_{54} & a_{55} & a_{56} \end{bmatrix}$$

with 5×6 dimensions is then given by executing the modulating and mapping procedure, wherein the elements $a_{16}$, $a_{26}$, $a_{36}$, $a_{46}$, $a_{56}$ in the matrix $T_1'$ compose the extra part, the rest elements in the matrix $T_1'$ compose the modulation part.

In the modulating and mapping procedure, the element $a_{16}$ in the extra part is set to "1" due to the corresponding row (first row) in the matrix $T_1$ has an odd number of elements having an even value (five "2"s); then elements $a_{11} \sim a_{15}$ in the modulation part are modulated to [0 0 0 0 0] due to all elements in the matrix $T_1$ having an even value are set to "0".

The element $a_{26}$ in the extra part is set to "0" due to the corresponding row (second row) in the matrix $T_1$ has an even number of elements having an even value (two "2"s); then elements $a_{21} \sim a_{25}$ in the modulation part are modulated to [0 1 0 0 1] due to all elements in the matrix $T_1$ having an even value are set to "0", and all elements in the matrix $T_1$ having an odd value are set to "1".

The element $a_{36}$ in the extra part is set to "0" due to the corresponding row (third row) in the matrix $T_1$ has an even number of elements having an even value (two "2"s); then elements $a_{31} \sim a_{35}$ in the modulation part are modulated to [0 0 0 1 1] due to all elements in the matrix $T_1$ having an even value are set to "0", and all elements in the matrix $T_1$ having an odd value are set to "1".

The element $a_{46}$ in the extra part is set to "1" due to the corresponding row (fourth row) in the matrix $T_1$ has an odd number of elements having an even value (one "2"); then elements $a_{41} \sim a_{45}$ in the modulation part are modulated to [1 1 1 1 0] due to all elements in the matrix $T_1$ having an even value are set to "0", and all elements in the matrix $T_1$ having an odd value are set to "1".

The element $a_{56}$ in the extra part is set to "1" due to the corresponding row (fifth row) in the matrix $T_1$ has an odd number of elements having an even value (one "2"); then elements $a_{51} \sim a_{55}$ in the modulation part are modulated to [0 1 1 1 1] due to all elements in the matrix $T_1$ having an even value are set to "0", and all elements in the matrix $T_1$ having an odd value are set to "1".

Through the above modulating and mapping procedure, the matrix $T_1'$ is obtained:

$$T_1' = \begin{bmatrix} a_{11} & a_{12} & a_{13} & a_{14} & a_{15} & | & a_{16} \\ a_{21} & a_{22} & a_{23} & a_{24} & a_{25} & | & a_{26} \\ a_{31} & a_{32} & a_{33} & a_{34} & a_{35} & | & a_{36} \\ a_{41} & a_{42} & a_{43} & a_{44} & a_{45} & | & a_{46} \\ a_{51} & a_{52} & a_{53} & a_{54} & a_{55} & | & a_{56} \end{bmatrix} = \begin{bmatrix} 0 & 0 & 0 & 0 & 0 & | & 1 \\ 0 & 1 & 0 & 0 & 1 & | & 0 \\ 0 & 0 & 0 & 1 & 1 & | & 0 \\ 1 & 1 & 1 & 1 & 0 & | & 1 \\ 0 & 1 & 1 & 1 & 1 & | & 1 \end{bmatrix}$$

The matrix $T_1'$ is then sequentially presented on the data plane 14 for forming the image frame.

Figure 3:
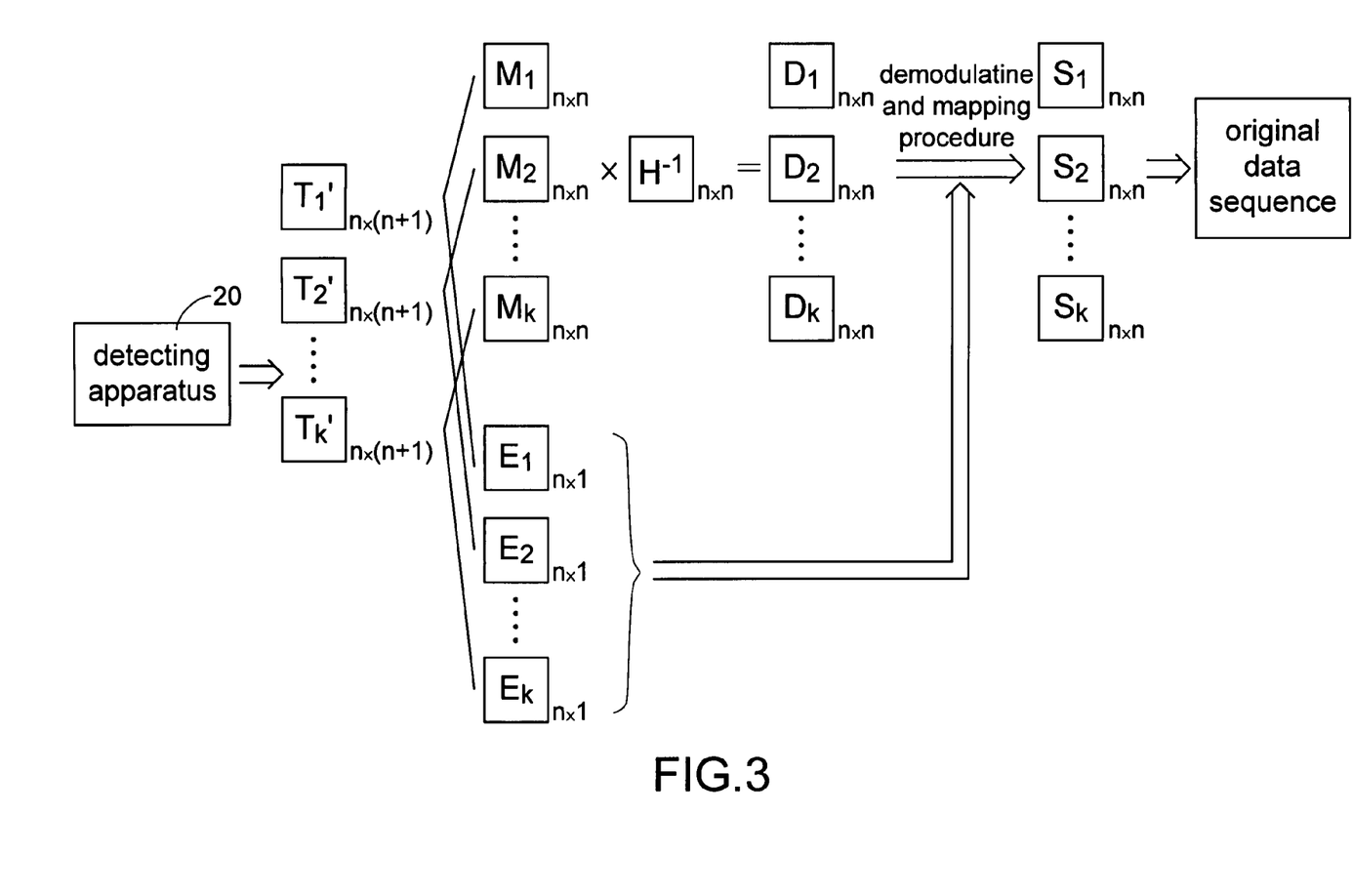
FIG. 3 is a flow chart showing a process of demodulating an image frame to an original data sequence of the present invention in a holographic storage system.

FIG. 3 is a flow chart showing the process of demodulating the image frame to the original data sequence of the present invention in a holographic storage system. When the detecting apparatus 20 in the holographic storage system receives the image frame, the control circuit (not shown) in the holographic storage system then separates the image frame to k numbers of matrices $(T_1' \sim T_k')$ with $n \times (n+1)$ dimensions, wherein the k numbers of matrices $(T_1' \sim T_k')$ with $n \times (n+1)$ dimensions are composed of k numbers of modulation parts $(M_1 \sim M_k)$ with $n \times n$ dimensions and k numbers of extra parts $(E_1 \sim E_k)$ with $n \times 1$ dimensions. Furthermore, another k numbers of matrices $(D_1 \sim D_k)$ with $n \times n$ dimensions are obtained through multiplying the modulation part $(M_1 \sim M_k)$ by an inverse matrix of the sparse matrix $(H_{n \times n}^{-1})$. The k numbers of matrices $(D_1 \sim D_k)$ with $n \times n$ dimensions are converted to k numbers of matrices $(S_1 \sim S_k)$ with $n \times n$ dimensions by executing a demodulating and mapping procedure with a reference of the corresponding extra parts $(E_1 \sim E_k)$, and finally the k numbers of matrices $(S_1 \sim S_k)$ with $n \times n$ dimensions are restored back to the original data sequence.

As depicted in FIG. 3, the demodulating and mapping procedure functions for demodulating the k numbers of matrices $(D_1 \sim D_k)$ with $n \times n$ dimensions and restoring back to the original data sequence according to the extra part. The demodulating and mapping procedure, applied to a matrix $D_1$, follows the rules of: (I) Setting all elements having an even value in each row of the matrix $D_1$ to "1", wherein the even value can be a positive or negative value; and (II) Executing or not executing a complement procedure to each row of the matrix $D_1$ according to the value of the corresponding element in the extra part, in another word, executing the complement procedure to each element in a row of the matrix $D_1$ if the corresponding element in the extra part is "1", alternatively, keeping each element in a row of the matrix $D_1$ to same state if the corresponding element in the extra part is "0".

In the above-mentioned example:

$$T_1' = \begin{bmatrix} 0 & 0 & 0 & 0 & 0 & | & 1 \\ 0 & 1 & 0 & 0 & 1 & | & 0 \\ 0 & 0 & 0 & 1 & 1 & | & 0 \\ 1 & 1 & 1 & 1 & 0 & | & 1 \\ 0 & 1 & 1 & 1 & 1 & | & 1 \end{bmatrix}$$

the modulation part $$(M_1) = \begin{bmatrix} 0 & 0 & 0 & 0 & 0 \\ 0 & 1 & 0 & 0 & 1 \\ 0 & 0 & 0 & 1 & 1 \\ 1 & 1 & 1 & 1 & 0 \\ 0 & 1 & 1 & 1 & 1 \end{bmatrix},$$

the extra part $$(E_1) = \begin{bmatrix} 1 \\ 0 \\ 0 \\ 1 \\ 1 \end{bmatrix}$$

The matrix $D_1$ is given from multiplying the modulation part by the inverse matrix of the sparse matrix:

$$D_1 = (M_1) \times (H_{5 \times 5}^{-1}) =$$

$$\frac{1}{2} \begin{bmatrix} 0 & 0 & 0 & 0 & 0 \\ 0 & 1 & 0 & 0 & 1 \\ 0 & 0 & 0 & 1 & 1 \\ 1 & 1 & 1 & 1 & 0 \\ 0 & 1 & 1 & 1 & 1 \end{bmatrix} \begin{bmatrix} 1 & 1 & -1 & -1 & 1 \\ -1 & 1 & 1 & -1 & 1 \\ 1 & -1 & -1 & 1 & 1 \\ 1 & -1 & 1 & 1 & -1 \\ -1 & 1 & 1 & 1 & -1 \end{bmatrix} = \begin{bmatrix} 0 & 0 & 0 & 0 & 0 \\ -2 & 2 & 2 & 0 & 0 \\ 0 & 0 & 2 & 2 & -2 \\ 2 & 0 & 0 & 0 & 2 \\ 0 & 0 & 2 & 2 & 0 \end{bmatrix}$$

In the demodulating and mapping procedure, the first row in the matrix D1 is stayed at [0 0 0 0 0] without changing due to no elements having an even value in the first row of the matrix D1. The first row in the matrix D1 is further converted to [1 1 1 1 1] due to the complement procedure is executed in response to the corresponding element a16 in the extra part is "1".

The second row in the matrix D1 is converted to [1 1 1 0 0] due to three elements in the second row of the matrix D1 are even values and set to "1". The second row in the matrix D1 is then stayed at [1 1 1 0 0] without changing due to the complement procedure is not executed in response to the corresponding element a26 in the extra part is "0".

The third row in the matrix D1 is converted to [0 0 1 1 1] due to three elements in the third row of the matrix D1 are even values and set to "1". The third row in the matrix D1 is then stayed at [0 0 1 1 1] without changing due to the complement procedure is not executed in response to the corresponding element a36 in the extra part is "0".

The fourth row in the matrix D1 is converted to [1 0 0 0 1] due to two elements in the fourth row of the matrix D1 are even values and set to "1". The fourth row in the matrix D1 is further converted to [0 1 1 1 0] due to the complement procedure is executed in response to the corresponding element a46 in the extra part is "1".

The fifth row in the matrix D1 is converted to [0 0 1 1 0] due to two elements in the fifth row of the matrix D1 are even values and set to "1". The fifth row of the matrix D1 is further converted to [1 1 0 0 1] due to the complement procedure is executed in response to the corresponding element a56 in the extra part is "1".

The matrix $S_1$, can be used for obtaining the original data sequence, is given from the above-mentioned demodulating and mapping procedure:

$$S_1 = \begin{bmatrix} 1 & 1 & 1 & 1 & 1 \\ 1 & 1 & 1 & 0 & 0 \\ 0 & 0 & 1 & 1 & 1 \\ 0 & 1 & 1 & 1 & 0 \\ 1 & 1 & 0 & 0 & 1 \end{bmatrix}$$

In the embodiment of the present invention, the rules in the modulating and mapping procedure can have some other modifications. For example, the element in the extra part can be set to "0" if the corresponding row in the matrix $T_1$ has an odd number of elements having an even value; alternatively, the element in the extra part is set to "1" if the corresponding row has an even number of elements having an even value. Accordingly, for restoring the image frame back to the original data sequence, the demodulating and mapping procedure also has the similar modifications. Moreover, the extra part can be arrayed to different dimension. For example, the k numbers of matrices ($T_1'$~$T_k'$) with n×(n+1) dimensions can be arrayed to k numbers of matrices ($T_1'$~$T_k'$) with (n+1)×n dimensions.

One advantage of the present invention is: the encoding performance is increasing with the value of n, wherein n stands for the dimension of the sparse matrix. It is understood that more data can be stored in the holographic storage system if the encoding performance is enhanced. Another advantage of the present invention is: the SNR of the image frame is relatively low due to the number of the bright states is near to or less than the number of the dark states after the sparse matrix is applying and the modulating and mapping procedure is executing to the original data sequence.

However, some values in the original data sequence may generate more bright states in the image frame after multiplying by the sparse matrix and executing the modulating and mapping procedure, therefore, the present invention further provides a value mapping procedure to guarantee all the values in the original data sequence. After the value mapping procedure, a situation that the image frame has more bright states after multiplying by the sparse matrix and executing the modulating and mapping procedure will not happen.

Figure 4:
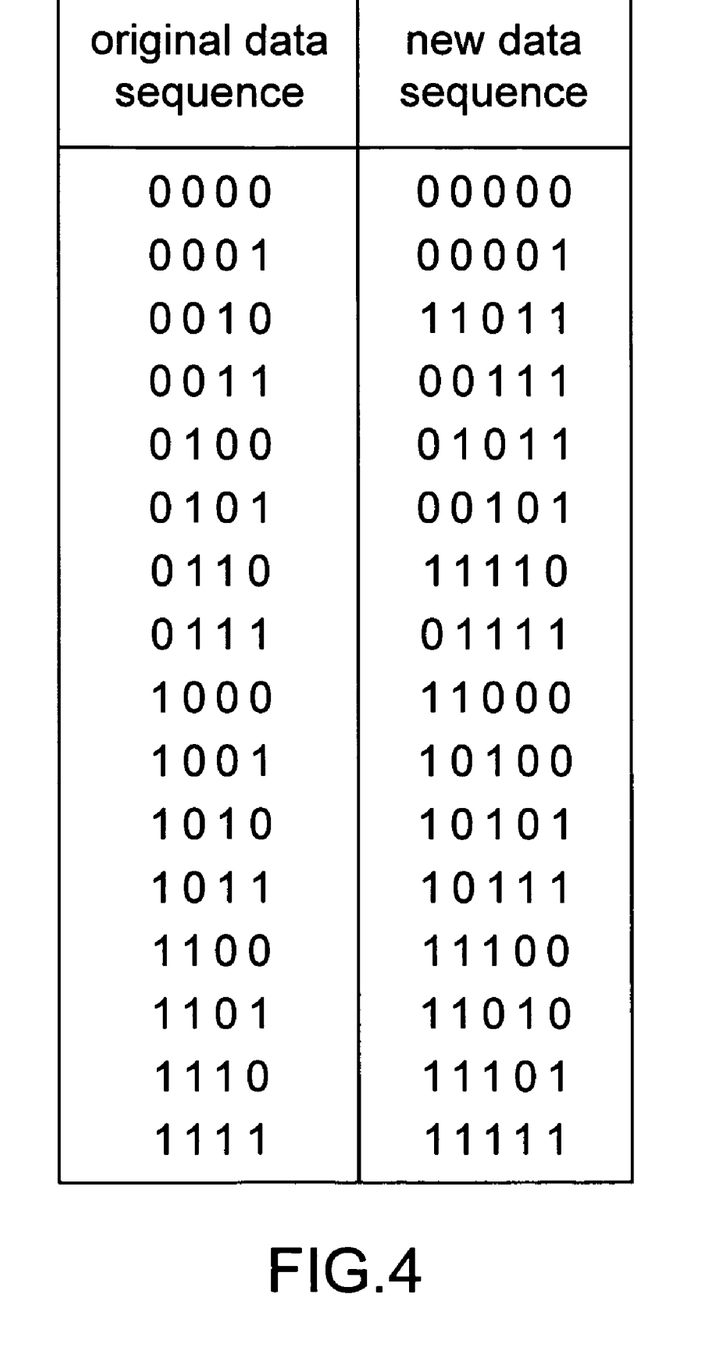
FIG. 4 is a diagram showing a value-mapping table of the present invention.

FIG. 4 is a value-mapping table of the present invention. The original data sequence with four digits is converted to a new data sequence with five digits with a reference of the value-mapping table. After multiplying by the sparse matrix and executing the modulating and mapping procedure, the converted data sequence with five digits can guarantee the image frame and have more dark states and less bright states.

Figure 5:
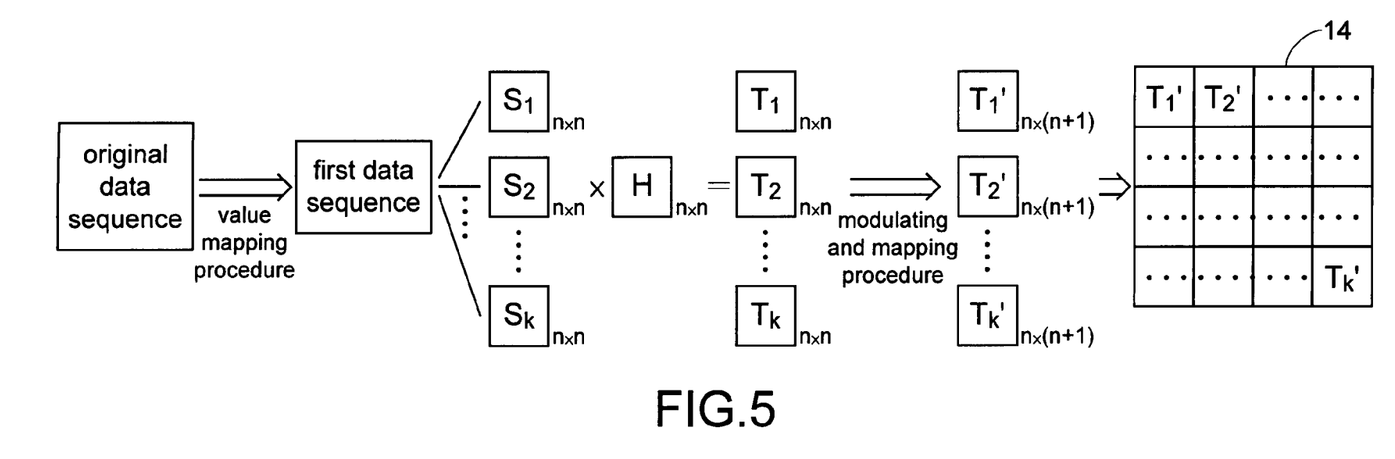
FIG. 5 is a flow chart showing a process of modulating an original data sequence to an image frame in another embodiment of the present invention in a holographic storage system.

FIG. 5 is a flow chart showing the process of modulating the original data sequence to the image frame in another embodiment of the present invention in a holographic storage system. The embodiment of the present invention includes steps of: generating a first data sequence by executing the value mapping procedure to the original data sequence; multiplying the first data sequence by the sparse matrix; executing the modulating and mapping procedure for obtaining the image frame, and then presenting the image frame on the data plane.

In the embodiment of the present invention, the original data sequence is converted to the first data sequence through the value mapping procedure. However, it is understood that the original data sequence can further be converted to the first data sequence by adding an ECC code to the original data sequence according to the ECC technique.

Figure 6:
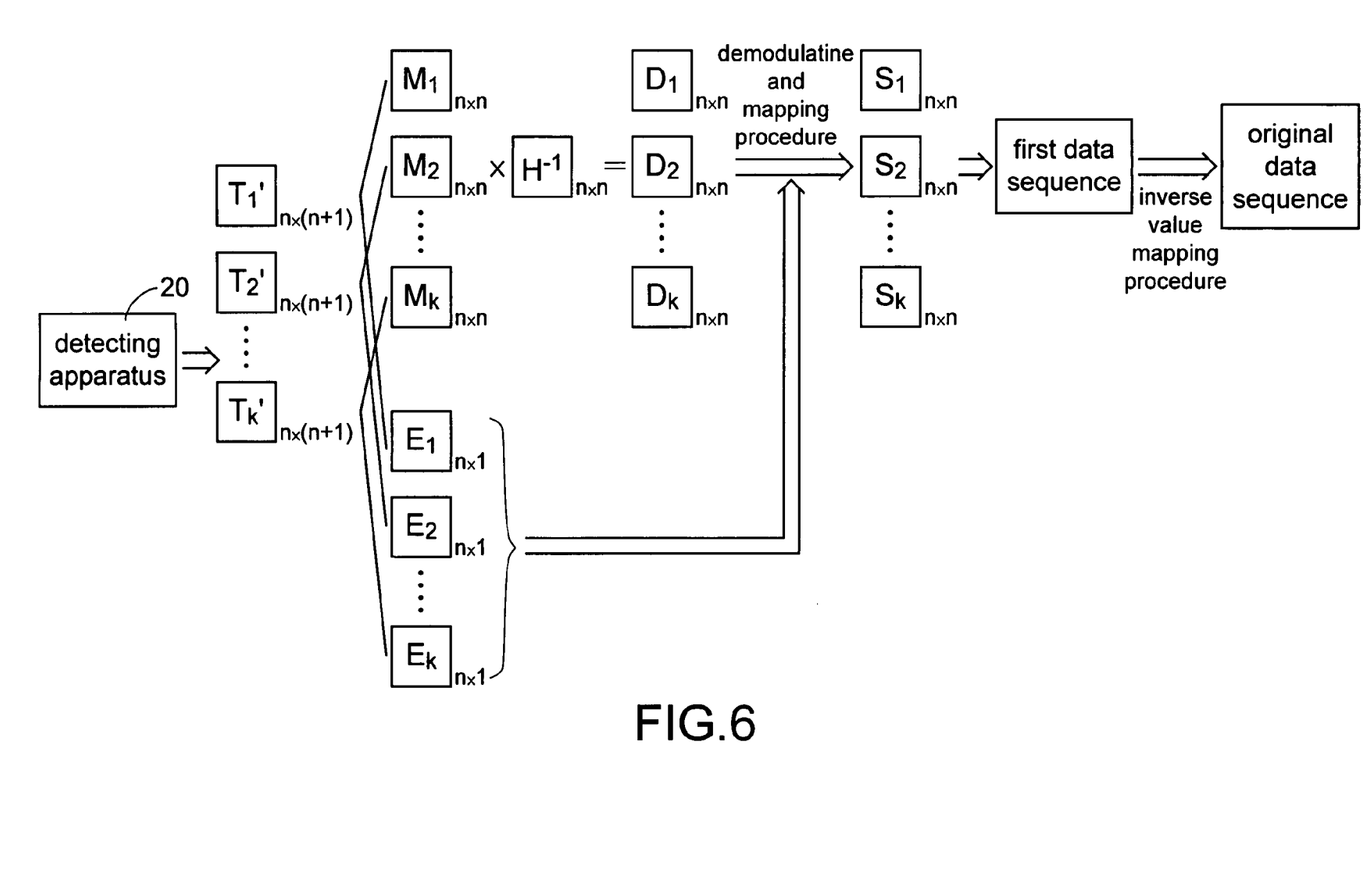
FIG. 6 is a flow chart showing a process of demodulating an image frame to an original data sequence in another embodiment of the present invention in a holographic storage system.

FIG. 6 is a flow chart showing the process of demodulating the image frame to the original data sequence in another embodiment of the present invention in a holographic storage system. The embodiment of the present invention includes steps of: generating the modulation part and the extra part from the image frame; multiplying the modulation part by an inverse matrix of the sparse matrix; executing a demodulating and mapping procedure for generating a first data sequence by the extra part; and executing an inverse value mapping procedure for obtaining the original data sequence.

The image frame is guaranteed to having more dark states than the bright states in the embodiment of the present invention depicted in FIG. 5 and FIG. 6, so as the image frame has relatively low SNR and error data rate.

Figure 7:
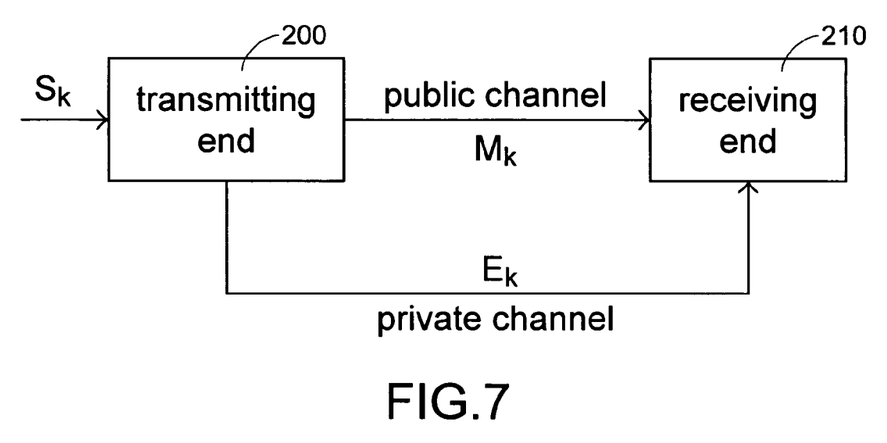
FIG. 7 is a diagram showing a two-dimension data encryption system of the present invention.

Additionally, the present invention can be also applied to a two-dimension data encryption. FIG. 7 is a diagram showing a two-dimension data encryption system of the present invention. In the two-dimension data encryption system of the present invention, a sparse matrix ($H_{n \times n}$) is pre-defined at a transmitting end 200 and a receiving end 210. The modulation part ($M_k$) is directly transmitted from the transmitting end 200 to the receiving end 210 via the public channel after multiplying the original data sequence ($S_k$) by the sparse matrix ($H_{n \times n}$) with n×n dimensions and executing the modulating and mapping procedure. The extra part ($E_k$), served as a Key for decoding, is transmitted from the transmitting end 200 to the receiving end 210 via the private channel. The original data sequence ($S_k$) can be restored back at the receiving end 210 through decoding the modulation part ($M_k$) by using the sparse matrix ($H_{n \times n}$) with n×n dimensions and the Key. Obviously, in the two-dimension data encryption system of the present invention, the illegal users cannot restore back the original data sequence ($S_k$) if the illegal user has only one of sparse matrix ($H_{n \times n}$) or extra part ($E_k$).

While the invention has been described with reference to the preferred embodiments, the description is not intended to be construed in a limiting sense. It is therefore contemplated that the appended claims will cover any such modifications or embodiments as may fall within the scope of the invention defined by the following claims and their equivalents.

What is claimed is:

1. A data modulation method, comprising the step of using a processor to perform steps of:
   receiving a first data sequence;
   arraying the first data sequence to a first matrix with n×n dimensions;
   providing a sparse matrix with n×n dimensions;
   multiplying the first matrix by the sparse matrix to generate a second matrix with n×n dimensions;
   executing a modulating and mapping procedure for generating a third matrix with (n+1)×n or n×(n+1) dimensions, wherein the third matrix is composed of a modulation part and an extra part; and
   storing the third matrix;
   wherein the sparse matrix is a binary matrix, each row in the sparse matrix has an odd number of elements, all rows in the sparse matrix have a same even number of bit 1, all columns in the sparse matrix have a same even number of bit 1, and the sparse matrix has an inverse matrix.

2. The method according to claim 1, wherein the step of storing the third matrix further comprises steps of:
   converting the third matrix to an image frame by using a data plane; and
   storing the image frame to a storage medium.

3. The method according to claim 2, wherein the data plane is a spatial light modulator.

4. The method according to claim 3, wherein the spatial light modulator is a digital micro-mirror device or a liquid crystal display.

5. The method according to claim 1, wherein the first data sequence is an original data sequence.

6. The method according to claim 1, wherein the step of receiving the first data sequence further comprises steps of:
   receiving an original data sequence; and
   converting the original data sequence to the first data sequence by executing a value mapping procedure with a reference of a value-mapping table.

7. The method according to claim 1, further comprising steps of:
   dividing the third matrix to the modulation part and the extra part;
   multiplying the modulation part by the inverse matrix of the sparse matrix to generate a fourth matrix with n×n dimensions;
   executing a demodulating and mapping procedure to the fourth matrix and the extra part to generate the first matrix with n×n dimensions; and
   restoring the first data sequence according to the first matrix.

8. The method according to claim 7, further comprising steps of:
   receiving the restored first data sequence; and
   converting the first data sequence to an original data sequence by executing an inverse value mapping procedure with a reference of a value-mapping table.

9. The method according to claim 7, wherein the demodulating and mapping procedure comprises steps of:
   setting all elements having an even value in each row of the fourth matrix to bit 1;
   executing a complement procedure to all elements in a row of the fourth matrix if a corresponding element in the extra part is bit 1; and
   setting all elements in a row of the fourth matrix to a same state if a corresponding element in the extra part is bit 0.

10. The method according to claim 1, wherein the modulating and mapping procedure comprises steps of:
    setting an element in the extra part to bit 0 if a corresponding row in the second matrix has an even number of elements having an even value;
    setting an element in the extra part to bit 1 if a corresponding row in the second matrix has an odd number of elements having an even value; and
    completing the modulation part through setting all elements having an even value in the second matrix to bit 0 and setting all elements having an odd value in the second matrix to bit 1.

11. An encoding/decoding method, comprising the step of using a processor to perform steps of:
    arraying a data to a first matrix with n×n dimensions;
    providing a sparse matrix with n×n dimensions;
    multiplying the first matrix by the sparse matrix to generate a second matrix with n×n dimensions;
    executing a modulating and mapping procedure to the second matrix to generate a third matrix with (n+1×n or n×(n+1) dimensions, wherein the third matrix is composed of a modulation part and an extra part;
    transmitting the modulation part and the sparse matrix to a receiving end via a public channel;
    transmitting the extra part to the receiving end via a private channel; and
    restoring the data by using the modulation part, the sparse matrix, and the extra part;
    wherein the sparse matrix is a binary matrix, each row in the sparse matrix has an odd number of elements, all rows in the sparse matrix have a same even number of bit 1, all columns in the sparse matrix have a same even number of bit 1, and the sparse matrix has an inverse matrix.

12. The method according to claim 11, wherein the modulating and mapping procedure comprises steps of:
    setting an element in the extra part to bit 0 if a corresponding row in the second matrix has an even number of elements having an even value;
    setting an element in the extra part to bit 1 if a corresponding row in the second matrix has an odd number of elements having an even value; and
    completing the modulation part through setting all elements having an even value in the second matrix to bit 0 and setting all elements having an odd value in the second matrix to bit 1.

13. The method according to claim 11, wherein the step of restoring the data further comprises steps of:
    multiplying the modulation part by the inverse matrix of the sparse matrix to generate a fourth matrix with n×n dimensions;
    executing a demodulating and mapping procedure to the fourth matrix and the extra part to obtain the first matrix with n×n dimensions; and
    restoring the first matrix back to the data.

14. The method according to claim 13, wherein the demodulating and mapping procedure comprises steps of:
    setting all elements having an even value in each row of the fourth matrix to bit 1;
    executing a complement procedure to all elements in a row of the fourth matrix if a corresponding element in the extra part is bit 1; and
    setting all elements in a row of the fourth matrix to a same state if a corresponding element in the extra part is bit 0.

* * * * *